US008734289B2

(12) United States Patent
Pinnekamp et al.

(10) Patent No.: US 8,734,289 B2
(45) Date of Patent: May 27, 2014

(54) SYSTEM FOR THE GENERATION OF MECHANICAL AND/OR ELECTRICAL ENERGY

(75) Inventors: Burkhard Pinnekamp, Augsburg (DE); Ingo Sommer, Donauwoerth (DE)

(73) Assignee: Renk Aktiengesellschaft, Augsburg (DE)

( * ) Notice: Subject to any disclaimer, the term of this patent is extended or adjusted under 35 U.S.C. 154(b) by 138 days.

(21) Appl. No.: 13/253,123

(22) Filed: Oct. 5, 2011

(65) Prior Publication Data
US 2012/0100954 A1    Apr. 26, 2012

(51) Int. Cl.
*F16H 1/46*    (2006.01)

(52) U.S. Cl.
USPC ............................... 475/338; 475/903

(58) Field of Classification Search
USPC ................. 475/248, 249, 338, 339, 340, 903
See application file for complete search history.

(56) References Cited

U.S. PATENT DOCUMENTS

| | | | |
|---|---|---|---|
| 3,396,594 A | | 8/1968 | Walker |
| 5,147,252 A | * | 9/1992 | Mace et al. .................. 475/226 |
| 5,518,464 A | | 5/1996 | Teraoka |
| 5,971,882 A | * | 10/1999 | Nishiji ........................ 475/252 |
| 6,080,076 A | * | 6/2000 | Kwoka et al. ................ 475/160 |
| 6,220,984 B1 | * | 4/2001 | Schulz et al. ................ 475/340 |
| 7,935,020 B2 | * | 5/2011 | Jansen et al. ................ 475/338 |

FOREIGN PATENT DOCUMENTS

| | | |
|---|---|---|
| DE | 38 09 577 | 10/1989 |
| DE | 689 10 885 | 3/1994 |
| DE | 197 56 966 | 6/1999 |
| EP | 1 619 386 | 9/2009 |
| FR | 7 00 237 | 2/1931 |

OTHER PUBLICATIONS

English translation of EP1619386A2; Aug. 23, 2013, http://translationportal.epo.org.*
Search Report issued on Apr. 7, 2011 in German Patent Application No. 10 2010 041 474.3.
Dinter, R. "Wie geht es weiter be der Getriebeentwicklung?" Winergy AG, Voerde. In: Erneuerbare Energien, Aug. 2003, S. 26-30.

* cited by examiner

*Primary Examiner* — Roger Pang
(74) *Attorney, Agent, or Firm* — Cozen O'Connor

(57) ABSTRACT

A power split gearbox (1) has: a driveshaft (10), a plurality of identically shaped first planet shafts (20) rotatably arranged mounted around the driveshaft, wherein a first planet toothing and a second planet toothing are provided on the first planet shafts, wherein the first planet toothings are in mesh with the teeth of the drive toothing, a plurality of identically shaped second planet shafts (30) which are each arranged so as to be rotatably mounted on the radially outer side around the first planet shafts, wherein the second planet shafts have in each instance a third planet toothing and, a fourth planet toothing, and wherein two of the third planet toothings are in mesh with the teeth of one of the second planet toothings, and a central wheel (40) in mesh with the teeth of the fourth planet toothings.

18 Claims, 2 Drawing Sheets

SYSTEM FOR THE GENERATION OF MECHANICAL AND/OR ELECTRICAL ENERGY

BACKGROUND OF THE INVENTION

1. Field of the Invention

The invention is directed to a power split gearbox such as that used, for example, in wind energy plants and test stands provided for this purpose.

2. Description of the Prior Art

In the article by Dr. R. Dinter in the periodical ERNEUERBARE ENERGIEN, August 2003, pages 26-30, a power split gearbox (in this case referred to as a multi duored gearbox) for wind energy plants is described with reference to FIG. 5 of the article.

It is thus an object of the invention to provide a power split gearbox which ensures an especially uniform load distribution in the gearbox.

SUMMARY OF THE INVENTION

According to the present invention, a power split gearbox comprises a driveshaft which is rotatably mounted so as to provide a drive of the power split gearbox and which has a drive toothing provided thereon in a torque-transmitting manner; a plurality of identically shaped first planet shafts which are each arranged so as to be rotatably mounted around the driveshaft, a first planet toothing and a second planet toothing which is axially offset relative to the first planet toothing being provided in each instance on the first planet shafts in a torque-transmitting manner, the first planet toothings meshing with the teeth of the drive toothing; a plurality of identically shaped second planet shafts which are each arranged so as to be rotatably mounted on the radially outer side around the first planet shafts, the second planet shafts having in each instance a third planet toothing and, at an axial offset relative to the latter, a fourth planet toothing which are provided in a torque-transmitting manner thereon, and two of the third planet toothings each mesh with the teeth of one of the second planet toothings, respectively; and a central wheel which is rotatably mounted on the radially inner side of the second planet shafts coaxial to the driveshaft and which meshes with the teeth of the fourth planet toothings, the central wheel providing an output of the power split gearbox.

Owing to the fact that, according to the invention, the first planet shafts have the same shape (i.e., are identically constructed) with respect to one another and the second planet shafts have the same shape with respect to one another, the respective first and second planet shafts and stepped planets each have the same spring stiffness resulting in a constant and uniform load distribution between the first and second planet shafts, particularly also at the bearings thereof. In this way, wear is minimized on one hand and the power split gearbox is suitable for transmitting very high loads and torques of greater than 8 MNm on the other hand.

Further, the quantity of different structural component parts of the power split gearbox is reduced because of the identical shaping of the first planet shafts and second planet shafts, respectively, so that the complexity and, therefore, production costs and servicing costs are decreased.

According to the invention, the group of first planet shafts is fixed with respect to rotation around the driveshaft and with respect to rotation relative to the second planet shafts. Further, the second planet shafts are fixed with respect to rotation around the driveshaft and with respect to rotation relative to the first planet shafts.

According to the invention, the drive toothing and the planet toothings are formed integral with the driveshaft and planet shafts, respectively, and/or are arranged thereon, and the drive toothing and the planet toothings can be constructed in each instance in the form of a toothed shaft, a pinion or a toothed wheel. Accordingly, the drive toothing can also be designated as a sun wheel in terms of its function, and the planet toothings can also be designated as planet wheels in terms of their function.

According to the invention, for example, 1 or 2 drive loads (e.g., generators), depending on requirements, can be connected in a drive-type connection with the central wheel.

According to an embodiment of the invention, the first planet shafts are identically positioned axially with respect to one another and the second planet shafts are likewise identically positioned axially with respect to one another.

This is made possible due to the fact that the respective planet shafts are identically shaped according to the invention and advantageously assists the uniform load distribution and also a compact construction of the power split gearbox.

According to another embodiment of the invention, the second planet shafts are arranged so as to be angularly offset in circumferential direction relative to the first planet shafts so that every second planet toothing meshing with the teeth of third planet toothings is arranged at a respective circumferential angular distance of the two third planet toothings which accordingly mesh with the teeth thereof.

This mutual meshing of the third planet toothings with the second planet toothings additionally promotes the uniform load distribution and compact construction of the power split gearbox in an advantageous manner.

According to another embodiment of the invention, the drive toothing has a helical toothing having a first pitch, and the first planet toothings each have a helical toothing which has the first pitch and which is opposed to the helical toothing of the drive toothing.

According to yet another embodiment of the invention, the second planet toothings each have a helical toothing having a second pitch, and the third planet toothings each have a helical toothing which has the second pitch and which is opposed to the helical toothing of the second planet toothings.

The respective helical toothings provide for a reduced occurrence of noise and vibration in the power split gearbox according to the invention.

Owing to the fact that the second planet toothings preferably have a helical toothing which is directed or pitched opposite to the helical toothing of the drive toothing, the axial shear forces (due to opposed working directions) occurring in the power split gearbox as a result of the helical toothings are substantially neutralized. In order to take into account different toothing diameters, this can preferably be facilitated in that the second pitch differs from the first pitch, the second pitch preferably being greater than the first pitch.

According to another embodiment of the invention, the fourth planet toothings and the central wheel each have a spur toothing, and the central wheel is preferably supported so as to be displaceable axially by a quantity of millimeters (more preferably by ±50 mm).

Accordingly, the central wheel can be displaced axially during the operation of the power split gearbox and can accordingly accommodate operating tolerances.

According to the invention, gearbox components downstream of the central wheel and downstream of a component which is in mesh directly with the central wheel can again have a helical toothing in this case.

According to yet another embodiment of the invention, the power split gearbox further has a first planet carrier at which the first planet shafts are respectively rotatably mounted and a second planet carrier at which the second planet shafts are respectively rotatably mounted, and the first planet carrier and second planet carrier are connected to one another so as to be fixed, or very rigid, with respect to rotation relative to one another. The two planet carriers are in turn preferably fixed with respect to rotation on a base (e.g., a setup surface).

This ensures the transfer of torque between the two individual groups of planet shafts, and radially outer ring gears (such as are provided in conventional planetary gear units) can advantageously be omitted.

According to an embodiment of the invention, the quantity of second planet shafts provided is an arithmetic multiple of a quantity of the first planet shafts.

The quantity of first planet shafts is preferably equal to three and the quantity of second planet shafts is preferably equal to six. Alternatively, the quantity of first planet shafts is preferably equal to four and the quantity of second planet shafts is preferably equal to eight.

An optimal stepped power splitting and, therefore, an optimal increase in the power density in the power split gearbox are achieved in this way.

The invention also expressly extends to embodiments which do not stem from combinations of features from explicit back references to the claims so that the disclosed features of the invention can be combined in any way insofar as it is technically meaningful.

According to the invention, a wind energy plant and a test stand for a wind energy plant having, respectively, a power split gearbox according to one or more or all of the embodiment forms of the invention described above are also provided in any conceivable combination.

BRIEF DESCRIPTION OF THE DRAWINGS

The invention will be described in more detail in the following based on the accompanying drawings in which.

DETAILED DESCRIPTION OF THE PRESENTLY PREFERRED EMBODIMENT

Figure 1:
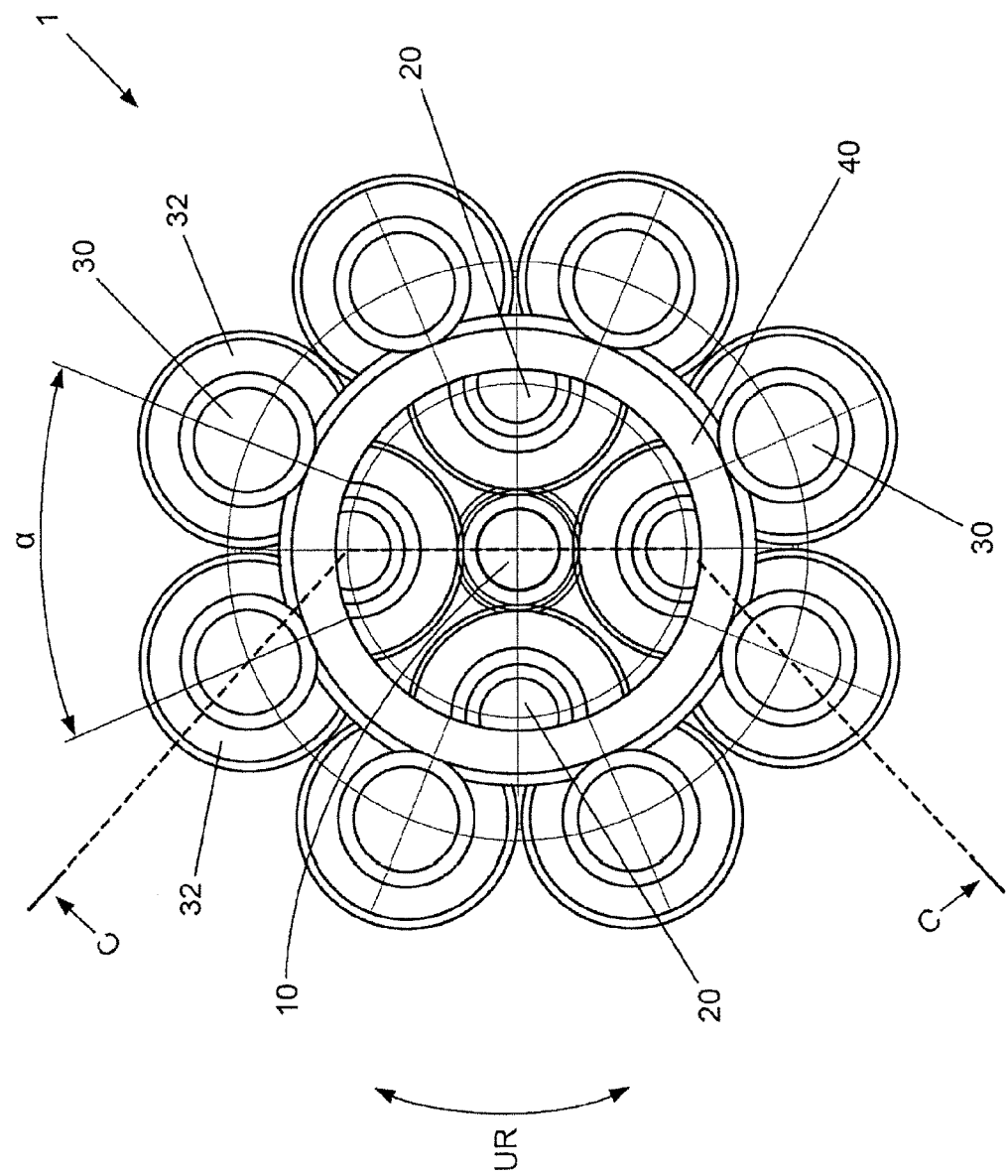
FIG. 1 is a front view of the output side of a power split gearbox according to an embodiment of the present invention.
Figure 2:
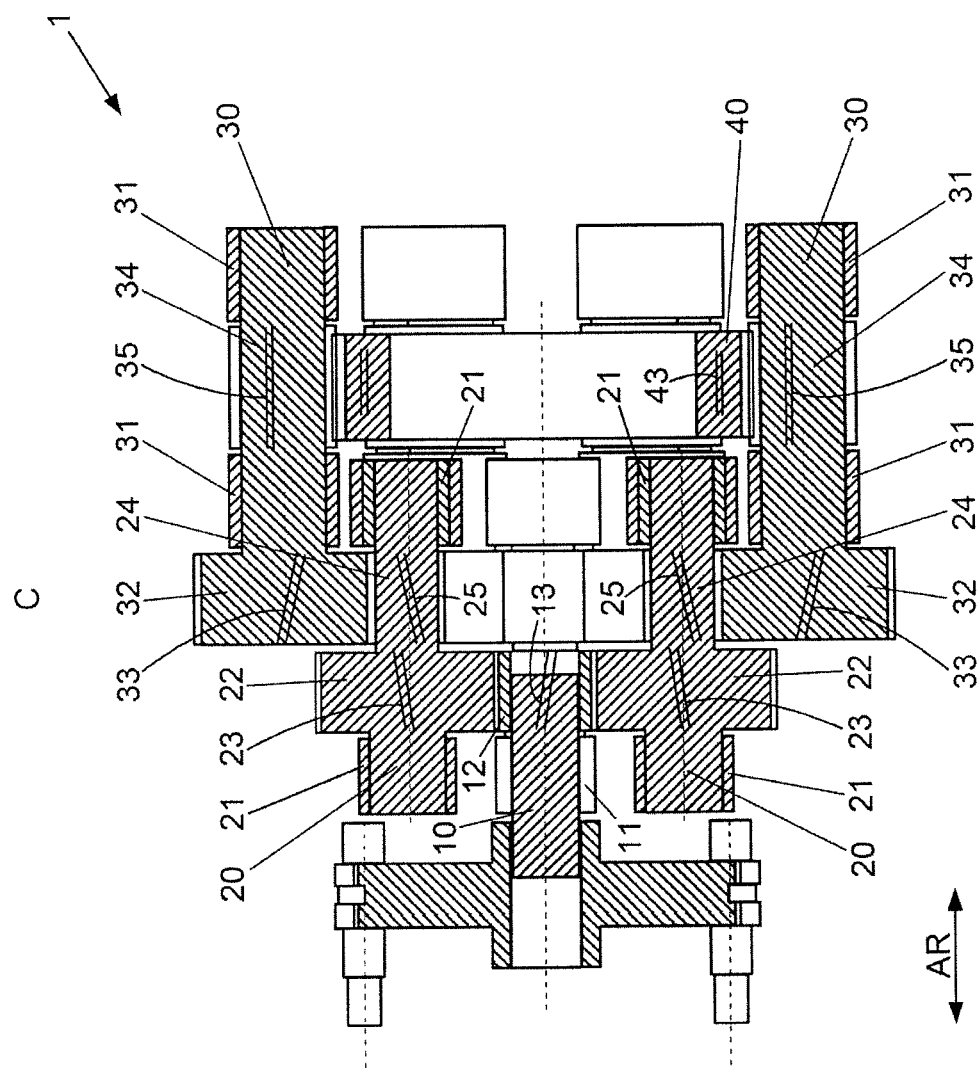
FIG. 2 is an axial sectional view through the power split gearbox of FIG. 1 along the line C-C in FIG. 1.

FIG. 1 and FIG. 2 show a power split gearbox 1 according to an embodiment of the present invention which can preferably be used in a wind energy plant or in a test stand for a wind energy plant.

The power split gearbox 1 has a driveshaft 10, a plurality of (in this case, four) identically shaped first planet shafts 20, a plurality of (in this case, eight) identically shaped second planet shafts 30, and a central wheel 40.

The driveshaft 10 is rotatably mounted in a plain bearing 11 so as to provide a drive of the power split gearbox 1. A sun wheel 12 which is constructed as a pinion and which has a drive toothing is fastened to the driveshaft 10 so as to transmit torque.

The drive toothing of the sun wheel 12 has a right-handed helical toothing 13 (diagonal double line in FIG. 2) having a first pitch which is designed in accordance with the torques to be transmitted and in accordance with the outer diameter of the sun wheel 12.

Each of the first planet shafts 20 is arranged symmetrically around the driveshaft 10 so as to be rotatably mounted in plain bearings 21 which are received in a first planet carrier (not shown separately). A first planet wheel 22 which is constructed as a gear wheel and has a first planet toothing and a second planet wheel 24 which is constructed so as to be axially offset relative to the latter as a toothed shaft and which has a second planet toothing are formed integral with the first planet shaft 20 so as to transmit torque.

As can be seen from FIG. 1 and FIG. 2, the first planet toothings of the first planet wheels 22 are in mesh with the teeth of the drive toothing of the sun wheel 12. To this end, the first planet toothing of every first planet wheel 22 has a left-handed helical toothing 23 (diagonal double line in FIG. 2) which is opposed to the helical toothing 13 of the drive toothing of the sun wheel 12 and which has the first pitch.

Each of the second planet shafts 30 is arranged symmetrically on the radially outer side around the first planet shafts 20 so as to be rotatably mounted in plain bearings 31 which are received in a second planet carrier (not shown separately). A third planet wheel 32 which is constructed as a gear wheel and has a third planet toothing and a fourth planet wheel 34 which is constructed so as to be axially offset relative to the latter as a toothed shaft and which has a fourth planet toothing are formed integral with the second planet shaft 30 so as to transmit torque.

As can be seen from FIG. 1 and FIG. 2, the third planet toothings of every two of the third planet wheels 32 are in mesh with the teeth of the second planet toothing of one of the second planet wheels 24. To this end, the second planet toothing of every second planet wheel 24 has a left-handed helical toothing 25 (diagonal double line in FIG. 2) which has a second pitch. The third planet toothing of every third planet wheel 32 has a right-handed helical toothing 33 (diagonal double line in FIG. 2) which is opposed to the helical toothing 25 of the second planet toothings of the second planet wheels 24 and has the second pitch.

As can be seen from FIG. 2, the second pitch differs from the first pitch and, according to the embodiment form of the invention shown herein, is greater than the first pitch.

For purposes of transmitting torque, the first planet carrier and the second planet carrier are connected to one another so as to be fixed with respect to rotation, and particularly rigid with respect to rotation, relative to one another and are fixed with respect to rotation around the driveshaft 10 on a base (e.g., a housing), not shown.

As can be seen from FIG. 2, the first planet shafts 20 are identically positioned with respect to one another axially (in an axial direction AR) and the second planet shafts 30 are also identically positioned with respect to one another axially (in axial direction AR).

As can be seen from FIG. 1, the second planet shafts 30 are arranged so as to be offset at an angle to the first planet shafts 20 in a circumferential direction UR so that the second planet toothing of every second planet wheel 24 is arranged at a respective circumferential angular distance a of the third drive toothings of the two third planet wheels 32 meshing therewith.

The central wheel 40 is rotatably mounted on the radially inner side of the second planet shafts 30 coaxial to the driveshaft 10 and is in mesh with the teeth of the fourth planet toothings of the fourth planet wheels 34. The central wheel 40 provides an output of the power split gearbox 1 and, if necessary, can be connected in a drive-type connection with one or two (or more) drive load(s) (e.g., generators).

For the purpose of the tooth meshing between the fourth toothings and the central wheel 40, each of these has a spur toothing 35 and 43, respectively.

The central wheel 40 is mounted so as to be displaceable axially (in axial direction AR) by approximately ±50 mm.

As follows from the preceding description and from FIGS. 1 and 2, according to the invention, the quantity of second planet shafts 30 provided (in this case, eight) is an arithmetic multiple of (in this case, two or twice) the quantity (in this case, four) of the first planet shafts 20.

According to an embodiment form of the invention not shown in the drawings, the quantity of first planet shafts 20 could also be equal to three, for example, while retaining the multiple or ratio of two, and the quantity of second planet shafts 30 would then be equal to six.

The invention is not limited by the embodiments described above which are presented as examples only but can be modified in various ways within the scope of protection defined by the appended patent claims.

The invention claimed is:

1. A power split gearbox comprising:
   a driveshaft (10) having a drive toothing (13) and being rotatably mounted for driving said gear box in a torque-transmitting manner;
   a plurality of identically shaped first planet shafts (20) rotatably mounted around said driveshaft (10), said first planet shafts comprising a torque transmitting first planet toothing (23) and a torque transmitting second planet toothing (25) axially offset relative to said first planet toothing, said first planet toothing (23) being in mesh with the teeth of said drive toothing (13);
   a plurality of identically shaped second planet shafts (30) rotatably mounted radially outside around said first planet shafts (20), said second planet shafts (30) comprising a torque transmitting third planet toothing (33) and a torque transmitting fourth planet toothing (35) axially offset relative to said third planet toothing (33), two of said third planet toothings (33) being in mesh with the teeth of said second planet toothings (25); and
   a central wheel (40) rotatably mounted on the radially inner side of said second planet shafts (30) coaxial to said driveshaft (10) and in mesh with said fourth planet toothings, said central wheel constructed so as to provide an output of said power split gearbox, wherein said central wheel (40) is supported to be displaceable axially,
   wherein said fourth planet toothings (35) and said central wheel (40) each comprise a spur toothing (35, 43).

2. The power split gearbox according to claim 1, wherein said first planet shafts (20) are identically positioned axially with respect to one another, and wherein said second planet shafts (30) are identically positioned axially with respect to one another.

3. The power split gearbox according to claim 1, wherein said second planet shafts (30) are arranged so as to be angularly offset in a circumferential direction (UR) relative to said first planet shafts (20) so that each of said second planet toothing (25) is arranged at a respective circumferential angular distance (a) of said two third planet toothings (33) so as to mesh said respective toothings.

4. The power split gearbox according to claim 1, wherein said drive toothing (13) comprises a helical toothing having a first pitch, and wherein said first planet toothings (23) each comprise a helical toothing having said first pitch in a direction opposite to said helical toothing (13) of said drive toothing.

5. The power split gearbox according to claim 4, wherein said second planet toothings (25) each comprise a helical toothing having a second pitch, and wherein said third planet toothings (33) each comprise a helical toothing having said second pitch in a direction opposite to said helical toothing of the second planet toothings (25).

6. The power split gearbox according to claim 5, wherein said second pitch differs from said first pitch.

7. The power split gearbox according to claim 5, wherein said second pitch is greater than said first pitch.

8. The power split gearbox according to claim 1, further comprising a first planet carrier for rotatably mounting said first planet shafts (20) and a second planet carrier for rotatably mounting said second planet shafts (30) said first planet carrier and second planet carrier being connected to one another so as to be fixed with respect to rotation relative to one another.

9. The power split gearbox according to claim 1, wherein a quantity of said second planet shafts (30) is an arithmetic multiple of a quantity of said first planet shafts (20).

10. The power split gearbox according to claim 9, wherein said quantity of said first planet shafts (20) is equal to three and said quantity of said second planet shafts (30) is equal to six.

11. The power split gearbox according to claim 9, wherein said quantity of said first planet shafts (20) is equal to four and said quantity of said second planet shafts (30) is equal to eight.

12. The power split gearbox according to claim 2, wherein said second planet shafts (30) are arranged so as to be angularly offset in a circumferential direction (UR) relative to the first planet shafts (20) so that each of said second planet toothing (25) is arranged at a respective circumferential angular distance (α) of said two third planet toothings (33) so as to mesh said respective toothings.

13. The power split gearbox according to claim 2, wherein said drive toothing (13) comprises a helical toothing having a first pitch, and wherein said first planet toothings (23) each comprise a helical toothing having said first pitch in a direction opposite to said helical toothing (13) of said drive toothing.

14. The power split gearbox according to claim 3, wherein said drive toothing (13) comprises a helical toothing having a first pitch, and wherein said first planet toothings (23) each comprise a helical toothing having said first pitch in a direction opposite to said helical toothing (13) of said drive toothing.

15. The power split gearbox according to claim 6, wherein said second pitch is greater than said first pitch.

16. The power split gearbox according to claim 3, wherein said fourth planet toothings (35) and said central wheel (40) each comprise a spur toothing (35, 43).

17. The power split gearbox according to claim 3, further comprising a first planet carrier for rotatably mounting said first planet shafts (20) and a second planet carrier for rotatably mounting said second planet shafts (30), said first planet carrier and second planet carrier being connected to one another so as to be fixed with respect to rotation relative to one another.

18. A power split gearbox, comprising:
   a driveshaft (10) having a drive toothing (13) and being rotatably mounted for driving said gear box in a torque-transmitting manner;
   a plurality of identically shaped first planet shafts (20) rotatably mounted around said driveshaft (10), said first planet shafts comprising a torque transmitting first planet toothing (23) and a torque transmitting second planet toothing (25) axially offset relative to said first planet toothing, said first planet toothing (23) being in mesh with the teeth of said drive toothing (13);
   a plurality of identically shaped second planet shafts (30) rotatably mounted radially outside around said first planet shafts (20), said second planet shafts (30) comprising a torque transmitting third planet toothing (33) and a torque transmitting fourth planet toothing (35) axially offset relative to said third planet toothing (33), two of said third planet toothings (33) being in mesh with the teeth of said second planet toothings (25); and a central wheel (40) rotatably mounted on the radially inner side of said second planet shafts (30) coaxial to said driveshaft (10) and in mesh with said fourth planet toothings, said central wheel constructed so as to provide an output of said power split gearbox, wherein said fourth planet toothings (35) and said central wheel (40) each comprise a spur toothing (35, 43), wherein said central wheel (40) is supported so as to be displaceable axially, wherein said second planet shafts (30) are arranged so as to be angularly offset in a circumferential direction (UR) relative to said first planet shafts (20) so that each of said second planet toothing (25) is arranged at a respective circumferential angular distance ($\alpha$) of said two third planet toothings (33) so as to mesh said respective toothings.

* * * * *